United States Patent Office 3,212,841
Patented Oct. 19, 1965

3,212,841
POLYESTER YELLOW DYEING
Lester N. Stanley, Delmar, N.Y., assignor to General Aniline & Film Corporation, New York, N.Y., a corporation of Delaware
No Drawing. Filed Oct. 15, 1963, Ser. No. 316,460
18 Claims. (Cl. 8—39)

This invention relates to an improved means for dyeing polyester or mixed polyester materials. More particularly, this invention relates to the dyeing of polyesters with a class of dyes having the formula:

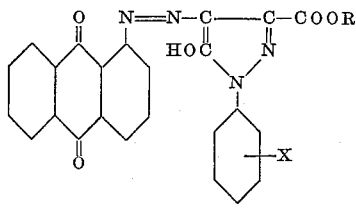

(I)

wherein R is a member selected from the group consisting of methyl and ethyl, and X is a member selected from the group consisting of hydrogen, chlorine, methyl and methoxy.

The increased use of polyester fibers in recent years has led to a demand for an improved process of dyeing these fibers. The use of conventional dyes, i.e., those previously found suitable for other synthetic materials such as polyamides and acetates, have not been found as suitable for polyesters. These dyes suffer from lack of wash-fastness and are not sufficiently resistant to fading or sublimation. The use of dyes wherein diazotizing and coupling occur directly upon the fiber gives rise to some improvements, but it is a lengthy and difficult process. Recently many new dyes have appeared on the market tailored particularly for polyester fibers. However, many of these dyes result in products of poor light fastness. Dyes of improved light fastness are usually subject to the drawback of insufficient resistance to sublimation at high temperatures. This problem is of importance since it prevents the use of high temperature dyeing processes (such as the widely used Thermosol process) which are of value in producing especially fast, bright dyes in an economical and practical manner. These difficulties continue to be particular problem in the polyester field due to the increasing popularity of the continuous Thermosol process for Dacron and cotton-Dacron blends.

It is an object of this invention to overcome the aforementioned and other difficulties by providing an improved means for dyeing polyester or mixed polyester materials.

It is a further object of this invention to provide a process which will yield dyed polyester materials having superior light and sublimation fastness.

It is another object of this invention to provide a superior high temperature process for the improved dyeing of polyester materials.

An object of this invention is a means for dyeing polyesters a strong, bright golden yellow of good build-up with fastness to both light and sublimation.

Other objects and advantages will appear in the detailed description which follows:

It has now been found that the above advantages are attained by the use of a diazotised aminoanthraquinone coupled with phenyl substituted 3-carboalkoxy-5-pyrazolone, as depicted in Formula I above.

The dyes employed in the process of this invention may be produced according to the general method of U.S. Patent No. 2,871,234 wherein the leuco sulfuric ester of 1-aminoanthraquinone is diazotized and coupled with a 3-carbomethoxy or 3-carbethoxy-1-phenyl-5-pyrazolone followed by oxidation to the anthraquinone azoic dye. The dyes may also be made by the direct diazotization of 1-amino-anthraquinone followed by coupling with a pyrazolone as shown below:

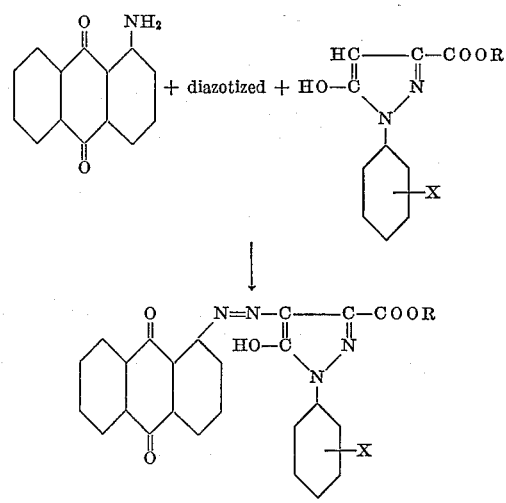

Pyrazolones useful in preparing dyestuffs of the present invention may be exemplified by the following:

3-carbomethoxy-1-phenyl-5-pyrazolone
3-carbethoxy-1-penyl-5-pyrazolone
3-carbethoxy-1-(m-chlorophenyl)-5-pyrazolone
3-carbethoxy-1-(p-tolyl)-5-pyrazolone
3-carbethoxy-1-(m-anisyl)-5-pyrazolone
3-carbomethoxy-1-(p-chlorophenyl)-5-pyrazolone
3-carbomethoxy-1-(o-chlorophenyl)-5-pyrazolone It is to be understood that these are but examples of suitable pyrazolones and that others may be used in their place. The dyes of this invention may be employed in the conventional manner well known in the prior art.

The dye powder is treated with dispersing agents in the manner of the preparation of dispersed acetate dye pastes in order that a dispersible dye may be obtained. Alternatively, a 40–50% active dispersed powder can be used in a similar manner but in lesser amounts. Conventional dispersing agents presently available are useful in the process of this invention. The alkylaryl-sulphonates, such as the methylene-dinaphthyl-sulphonates are suitable.

In carrying out the dyeing procedure of the present invention, a 20% active dispersed paste of the dyestuff is issolved in water at concentrations of 1 to 15 ounces per gallon. The solution is thickened to suitable padding consistency. Conventional thickeners, such as gum tragacanth may be used in quantities about twice that of the water employed. Adjuvants, such as surfactants and/or carriers are suitable. Chlorinated benzenes, diphenyl, or methyl salicylate and benzoate or salts of o-chlorophenol may be used as carriers.

The materials which are the subject of this invention may be any of he commercially available polyesters or mixed polyesters. The polycondensate of terephthalic acid with ethylene glycol is a common polyester which may be used. The condensates of other similar di-acids with di-alcohols are suitable. The 65% polyester–35% cotton blend of fibers is illustrative of the mixed polyester fabrics susceptable to the process of this invention.

The dyeing may be carried out in accordance with conditions well established in the art. Elevated temperatures and pressures are often advantageously employed. The padding step takes place at temperatures of 140° to 180° F. and after drying the fiber is subjected to temperatures between 390° and 440° F. for a period of time from ½ to 2 minutes in order to develop the full color. The following preferred means has resulted in a dyed polyester of markedly superior properties relative to prior art products.

Polyester material or mixed polyester-cotton material is padded with the above dyestuffs at about 140–180° F. The material is dried, and then heated at 390–440° F. for ½ to 2 minutes and is then finished in the conventional manner.

This procedure results in polyester dyeings of a strong, bright golden yellow color of excellent build-up with an unexpected fastness to both light and sublimation. This result is surprising in view of the inferior results obtained by dyeing other synthetic fibers with the dyestuff of this invention. The results of this invention are further unobvious since dye compounds of a structure related to the dyes of this invention have not been found satisfactory with polyester fibers (Table I, infra). As shown by the following examples it is a unique combination of polyester fibers and subject dyestuffs that has resulted in the instant invention. The dyeing of polyester fibers has proven to be a persistent problem especially in the yellow shade ranges to which the invention herein described has been a valuable solution. For example, most yellow dyes with suitable light-fastness, such as the example of U.S. 3,019,217, are not suited for Thermosoling because they sublime or volatilize during processing and smear not only the goods but the equipment.

The following examples which serve to illustrate the instant invention more fully are merely exemplary and not in any way limitative.

EXAMPLE I

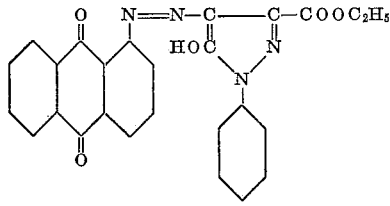

The above dye is prepared as follows:

46 grams of 1-aminoanthraquinone diazonium sulfate were dissolved at 35–40° C. in 1300 cc. of water, and clarified by treatment with Nuchar (activated carbon). In a separate vessel 46.4 grams of 3-carbethoxy-1-phenyl-5-pyrazolone were dissolved in 500 cc. of water containing 21.0 grams of soda ash and 22.0 grams of sodium bicarbonate. The anthraquinone diazo solution was then run into the pyrazolone coupler with agitation at a temperature below 15° C., and at a pH of 8–9, maintained by addition of dilute sodium hydroxide as required. 84 grams of a yellow dye were recovered which were dispersed with an equal amount of Polyfon H (sodium lignosulfonate) in a Werner-Pfleiderer mixer.

1 ounce of this dye was dissolved in 1 gallon of water and then thickened to a padding consistency with 0.2 ounce of Keltex gum (gum tragacanth) and 0.1 ounce of Leonil SA (anionic naphthalene-sulfonate dispersing agent). A 5½ x 18 inch piece of Dacron polyester fiber (poly-condensate of terephthalic acid with ethylene glycol) was padded with the above dye at 160° F., dried, and then subjected to 425° F. for 1½ minutes. The material was soaped for 5 minutes at the boil, rinsed and dried. A strong yellow dyeing of good build-up and exceptional light fastness properties and sublimation properties was obtained.

EXAMPLE II

A mixed 65–35 polyester-cotton fabric was dyed with the dye of Example I and in the same manner as in Example I. In this case also, the Dacron portion was colored a bright yellow, having excellent light fastness and sublimation fastness.

EXAMPLE III

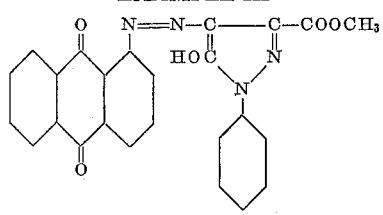

The above dye was prepared in the same manner as in Example I, except that the methyl ester of the pyrazolone was employed.

It was dispersed with Polyfon H (sodium lignosulfonate) as in Example I and padded onto polyester fiber. After drying, and treating at a temperature of 425° F. for 1½ minutes, a yellow dyeing was obtained which had outstanding light fastness and sublimation fastness.

EXAMPLE IV

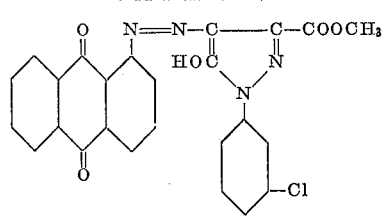

The above dye was prepared in the same manner as in Example I, but using the methyl ester of the o-chlorophenyl pyrazolone.

It was dispersed with Polyfon H (sodium lignosulfonate) as in Example I and padded onto polyester fabric. After drying and treating at a temperature of 425° F. for 1½ minutes a yellow dyeing was obtained which had outstanding light fastness and sublimation fastness.

EXAMPLE V

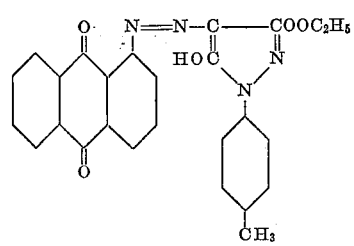

The above dye was prepared in the same manner as in Example I, but using the ethyl ester of the p-tolyl pyrazolone.

It was dispersed with Polyfon H (sodium lignosulfonate) as in Example I and padded onto polyester fabric. After drying and treating a temperature of 425° F. for 1½ minutes a yellow dyeing was obtained which had outstanding light fastness and sublimation fastness.

EXAMPLE VI

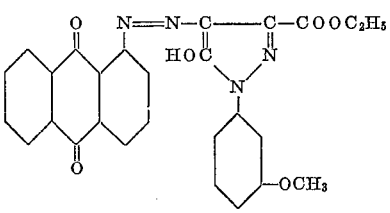

The above dye was prepared in the same manner as in Example I, but using the ethyl ester of the m-anisyl pyrazolone.

It was dispersed with polyfon H (sodium lignosulfonate) as in Example I and padded into polyester fabric. After drying and treating at a temperature of 425° F. for 1½ minutes a yellow dyeing was obtained which had outstanding fastness to light and sublimation.

The exceptional light fastness of the dyes of this invention is further demonstrated by comparisons with dyes of closely related structure.

Light fastness tests were conducted by exposing dyeings to ultra violet light in a standard fadeometer wherein the dyes were made and dispersed in the same manner as in Example I. The time was read at the visible time of fading. The materials showed fading after exposure time as follows:

*Table I*

| Dye | Hours Before Fading |
| --- | --- |
| (anthraquinone-N=N-C-C-COOC₂H₅ with phenyl pyrazole) | 270 |
| (anthraquinone-N=N-C(HOC)-C-CH₃ with NH pyrazole) | 35 |
| (anthraquinone-N=N-C(HOC)-C-CH₃ with phenyl pyrazole) | 20 |
| (anthraquinone-N=N-CH(C=O-CH₃)(C-OH)(NH-phenyl)) | 20 |

In addition to the exceptional light fastness of the dyes of this invention as shown above they may unexpectedly be subjected to high temperatures without sublimation. Prior art yellow dyes which have good light fastness are not usually sufficiently resistant to sublimation in high temperature dye processes above 300° F. This is illustrated, for example, by the following dye:

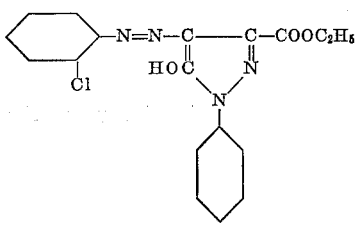

which uses the same coupler as that of the instant dye but has poor sublimation fastness and is not suitable for high temperature usage.

The above comparisons demonstrate the unpredictable nature of polyester dye processes. These comparisons additionally point out the drawbacks of poor light and sublimation fastness which is characteristic in the prior art. The unusual combination, or cooperation, found between the dyes of this invention and polyester materials has resulted in overcoming these disadvantages. This combination of superior light fastness and sublimation fastness of the dyes of this invention and the necessary affinity make them especially valuable for dyeing polyester fiber and polyester-cotton fiber in a high temperature process, to achieve bright yellow colors.

To further disclose the nature of applicant's process, equivalent dyeings with the dye of Example I were made on a polyester (Dacron), nylon, acetate and acrylonitriles (Orlon 41 and 42). 3% dyeings were made at or near the boil for 45 minutes. The polyester was dyed yellow, though not as strong or bright as in Example I. The acetate, nylon and Orlon 41 were slightly stained. Orlon 42 showed a very pale yellow coloration, but could not be considered satisfactory. Thus it is clear that these dyes are specific for polyesters.

This invention has been disclosed with respect to certain preferred embodiments, and various modifications will occur to one skilled in the art. It is to be understood that such modifications are to be included within the purview of this application and the scope of the appended claims.

What is claimed is:

1. A process for dyeing polyester-containing materials which comprises contacting said materials with a compound of the formula

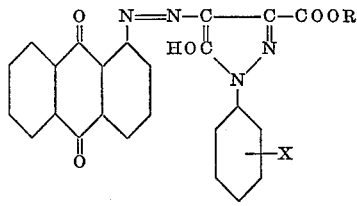

wherein R is a member selected from the group consisting of methyl and ethyl, and X is a member selected from the group consisting of hydrogen, chlorine, methyl, and methoxy.

2. A process for dyeing polyester-containing materials which comprises contacting said materials with a compound of the formula:

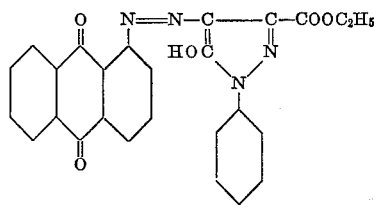

3. A process for dyeing polyester-containing materials which comprises contacting said materials with a compound of the formula:

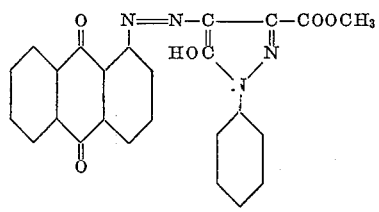

4. A process for dyeing polyester-containing materials which comprises contacting said materials with a compound of the formula:

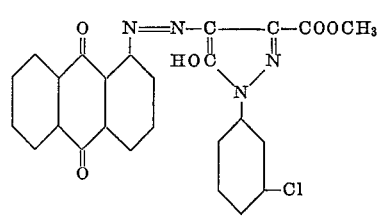

5. A process for dyeing polyester containing-materials which comprises contacting said materials with a compound of the formula:

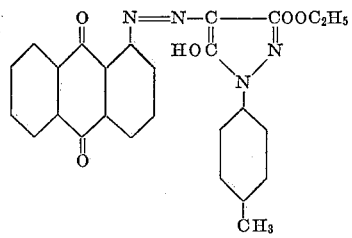

6. A process for dyeing polyester-containing materials which comprises contacting said materials with a compound of the formula:

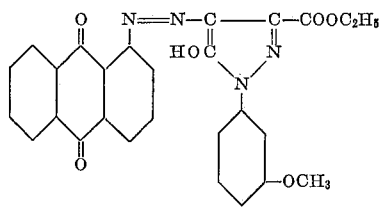

7. A process for dyeing polyester-containing materials which comprises contacting said materials with an aqueous dispersion comprising a dye of the formula:

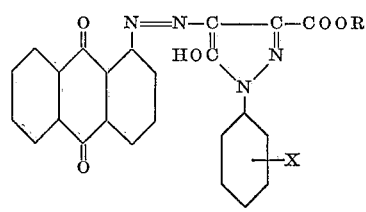

wherein R is a member selected from the group consisting of methyl and ethyl, and X is a member selected from the group consisting of hydrogen, chlorine, methyl, and methoxy, at a temperature between about 140° F. to about 180° F., drying said materials, thereafter heating said materials at a temperature between about 390° F. to about 440° F. for ½–2 minutes.

8. The process of claim 7 wherein said dye is

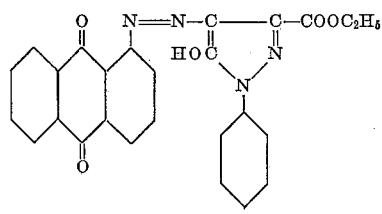

9. The process of claim 7 wherein said dye is

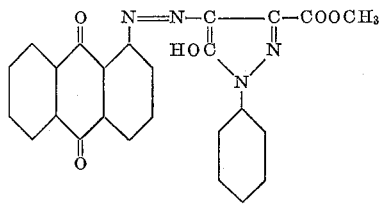

10. The process of claim 7 wherein said dye is

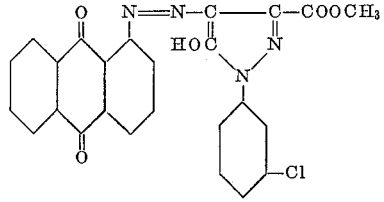

11. The process of claim 7 wherein said dye is

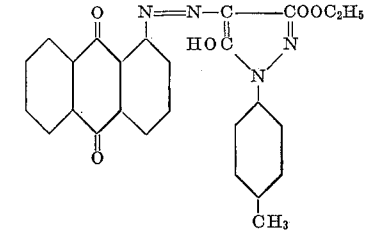

12. The process of claim 7 wherein said dye is

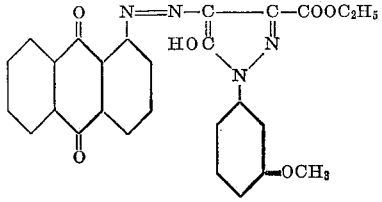

13. An improved polyester material made by the process of claim 7.
14. An improved polyester material made by the process of claim 8.
15. An improved polyester material made by the process of claim 9.
16. An improved polyester material made by the process of claim 10.
17. An improved polyester material made by the process of claim 11.
18. An improved polyester material made by the process of claim 12.

References Cited by the Examiner

UNITED STATES PATENTS

| | | | |
|---|---|---|---|
| 2,871,234 | 1/59 | Bergstrom | 260—162 |
| 2,934,397 | 4/60 | Landerl. | |
| 3,122,410 | 2/64 | Mueller et al. | 8—41 |

NORMAN G. TORCHIN, *Primary Examiner.*